United States Patent
Guo et al.

(10) Patent No.: US 9,565,511 B2
(45) Date of Patent: Feb. 7, 2017

(54) METHOD AND APPARATUS FOR IMPROVING LOW-COST MTC (MACHINE-TYPE COMMUNICATION) DEVICES IN A WIRELESS COMMUNICATION SYSTEM

(71) Applicant: INNOVATIVE SONIC CORPORATION, Taipei (TW)

(72) Inventors: Yu-Hsuan Guo, Taipei (TW); Meng-Hui Ou, Taipei (TW); Ko-Chiang Lin, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 434 days.

(21) Appl. No.: 13/675,348

(22) Filed: Nov. 13, 2012

(65) Prior Publication Data
US 2013/0121309 A1 May 16, 2013

Related U.S. Application Data

(60) Provisional application No. 61/559,279, filed on Nov. 14, 2011.

(51) Int. Cl.
*H04W 4/00* (2009.01)
*H04W 48/12* (2009.01)
*H04W 48/16* (2009.01)

(52) U.S. Cl.
CPC ............. *H04W 4/005* (2013.01); *H04W 48/12* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 2010/0272017 A1 | 10/2010 | Terry et al. | |
| 2013/0083753 A1* | 4/2013 | Lee | H04W 72/0453 370/329 |
| 2013/0203450 A1* | 8/2013 | Mochizuki et al. | 455/458 |
| 2013/0322320 A1* | 12/2013 | Lee | H04W 48/20 370/312 |

FOREIGN PATENT DOCUMENTS

| | | |
|---|---|---|
| TW | 304688 | 12/2008 |
| WO | 2007108630 A1 | 9/2007 |

(Continued)

OTHER PUBLICATIONS

3GPP TSG RAN WG1 Meeting #66bis, Zhuhai, China, Oct. 10-14, 2011 (R1-113204).

(Continued)

*Primary Examiner* — Ayaz Sheikh
*Assistant Examiner* — Sori Aga
(74) *Attorney, Agent, or Firm* — Blue Capital Law Firm, P.C.

(57) ABSTRACT

A method and apparatus are disclosed for improving low-cost MTC (Machine-Type Communication) devices in a wireless communication system. The method includes broadcasting, in a system information, a first information used for cell re-selection. The method further includes providing a second information, for a neighboring cell or a frequency, that is used for cell re-selection.

22 Claims, 6 Drawing Sheets

(56) References Cited

FOREIGN PATENT DOCUMENTS

WO         2011100570 A1    8/2011
WO    WO2011/139087    * 11/2011

OTHER PUBLICATIONS

3GPP TSG-RAN WG1 Meeting #67bis, San Francosco, Nov. 10-14, 2011 (R2-114188).
Search Report on corresponding EP Patent Application No. 12007678.1 dated Apr. 17, 2013.
Office Action on corresponding foreign application (TW101142149) from TIPO dated Oct. 17, 2014.

* cited by examiner

METHOD AND APPARATUS FOR IMPROVING LOW-COST MTC (MACHINE-TYPE COMMUNICATION) DEVICES IN A WIRELESS COMMUNICATION SYSTEM

CROSS-REFERENCE TO RELATED APPLICATIONS

The present Application claims the benefit of U.S. Provisional Patent Application Ser. No. 61/559,279 filed on Nov. 14, 2011, the entire disclosure of which is incorporated herein by reference.

FIELD

This disclosure generally relates to wireless communication networks, and more particularly, to a method and apparatus for improving low-cost MTC devices in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed for improving low-cost MTC (Machine-Type Communication) devices in a wireless communication system. The method includes broadcasting, in a system information, a first information used for cell re-selection. The method further includes providing a second information, for a neighboring cell or a frequency, that is used for cell re-selection.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. RP-111112, "Proposed SID: Provision of low-cost MTC UEs based on LTE", Vodafone; R1-113440, "Initial complexity analysis of MTC LTE UEs", IPWireless; TS 36.306 V10.3.0, "E-UTRA; UE radio access capabilities"; R1-112912, "Overview on low-cost MTC UEs based on LTE", Huawei, HiSilicon, CMCC; TS 36.331 V10.3.0, "E-UTRA; RRC protocol specification"; TS 36.213 V10.3.0, "E-UTRA physical layer procedures"; TS 36.211 V10.3.0, "E-UTRA physical channels and modulation"; R1-114329, "E-PDCCH design principles", Nokia, Nokia Siemens Network; and TS 36.304 V10.3.0, "E-UTRA; UE procedures in idle mode". The standards and documents listed above are hereby expressly incorporated herein.

Figure 1:
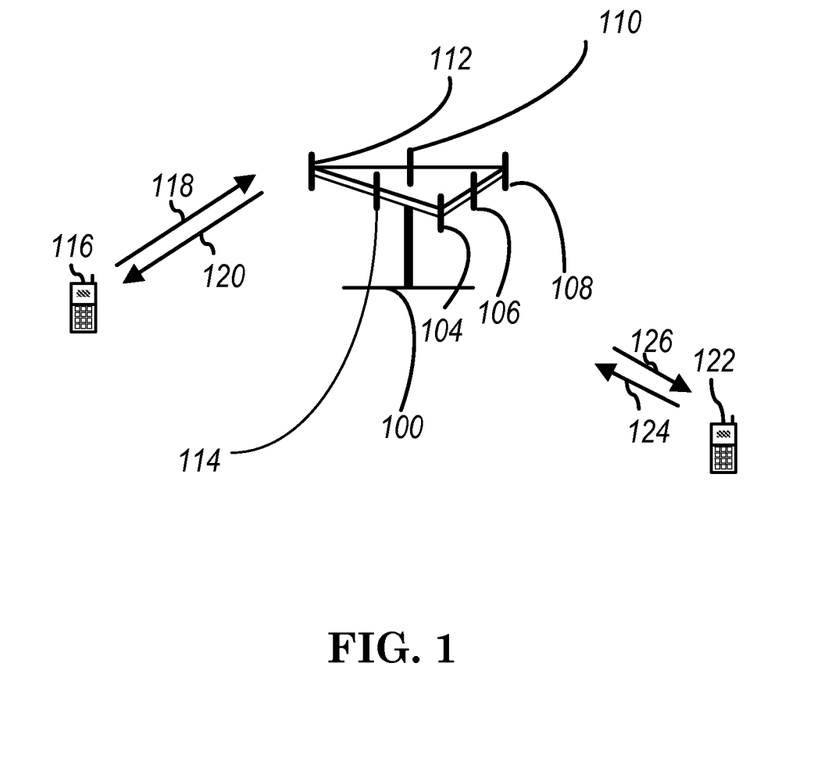
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
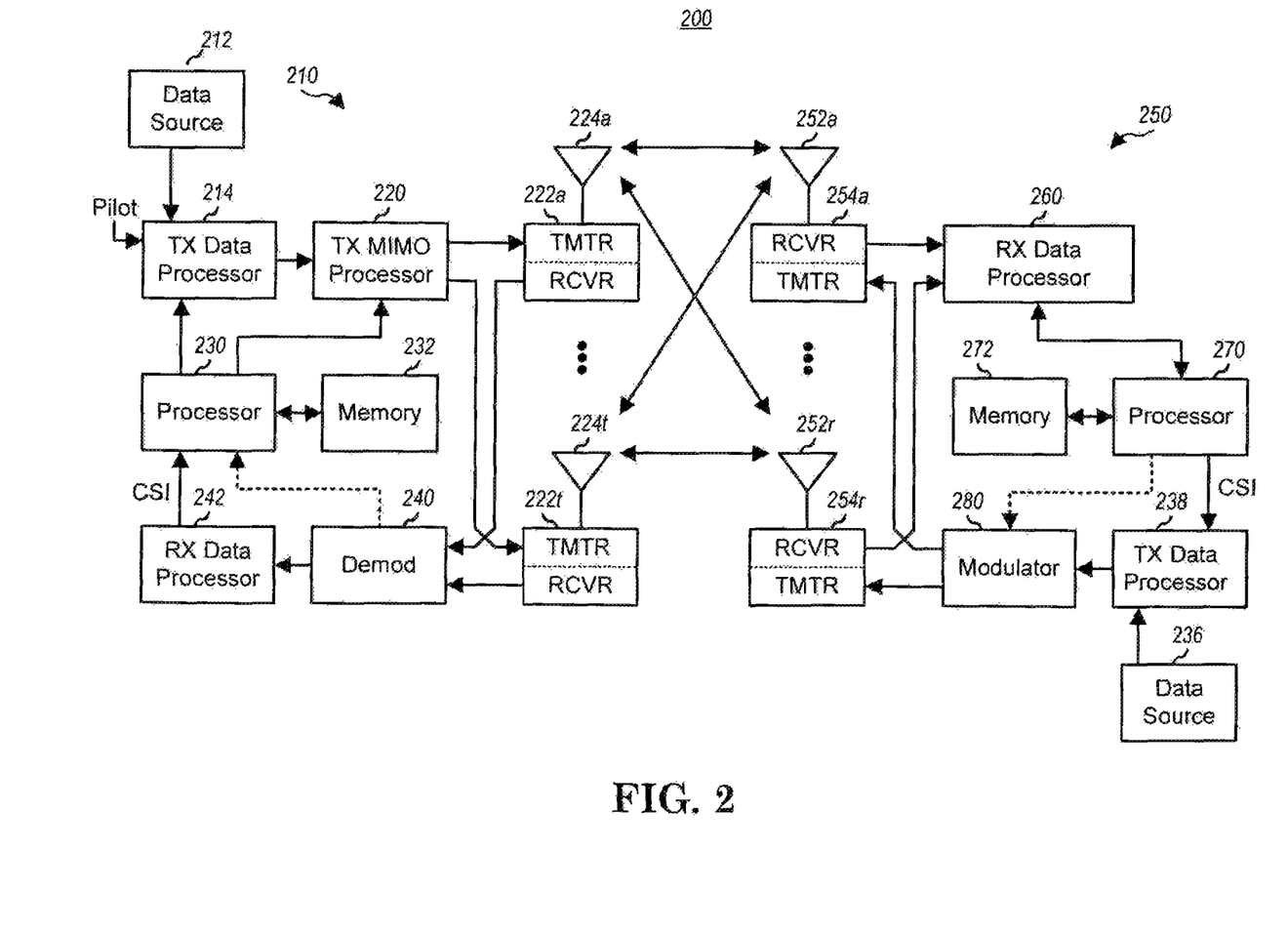
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
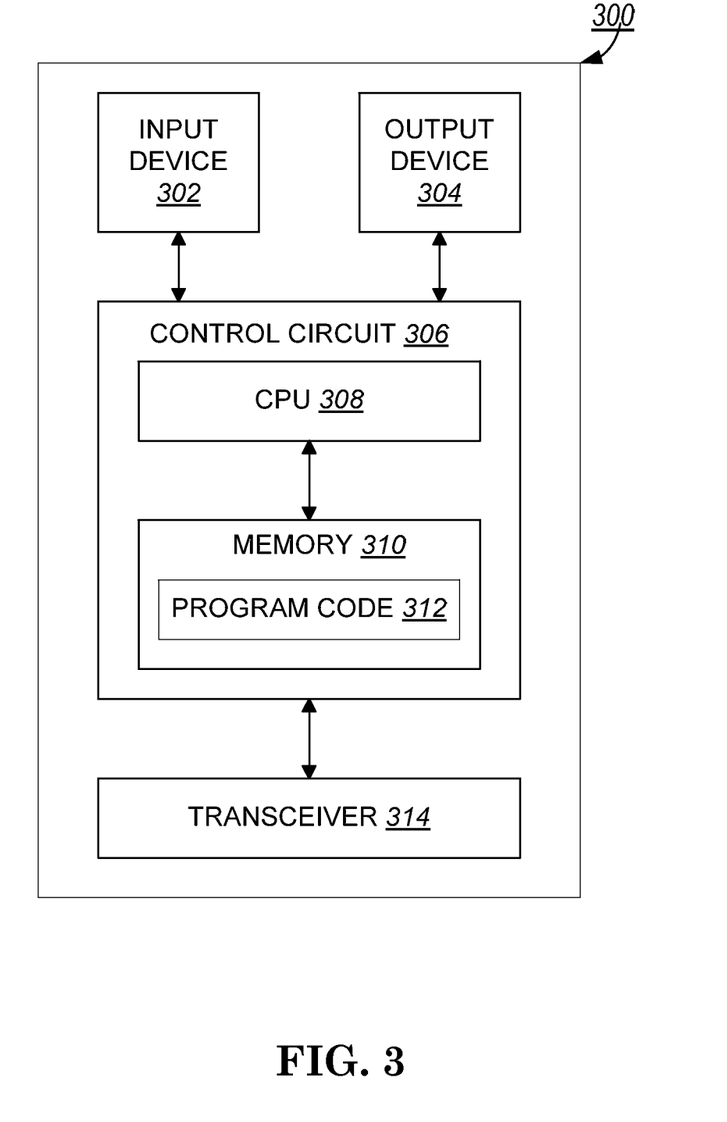
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
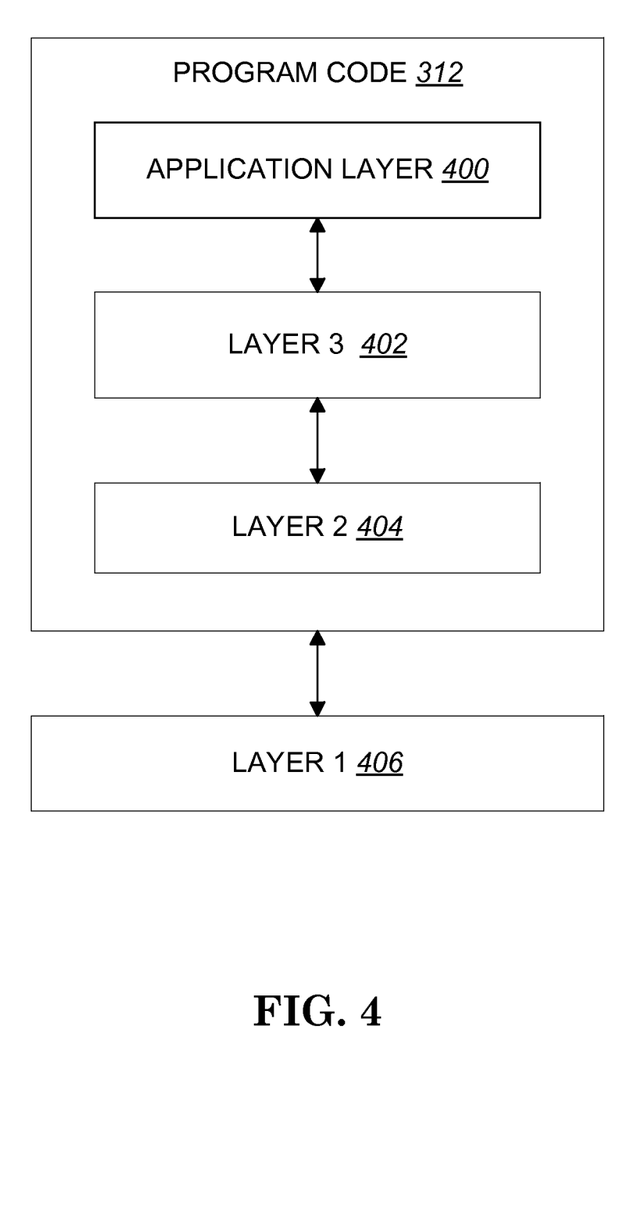
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As described in 3GPP RP-111112, new study item "Provision of low-cost MTC UEs based on LTE" was discussed for the first time in RAN1#66bis meeting. The general intention of the study item is described below:

Machine-Type Communications (MTC) is a market that is likely to continue expanding in the future. Many MTC devices are targeting low-end (low cost, low data rate) applications that can be handled adequately by GSM/GPRS (Global System for Mobile Communication/General Packet Radio Service).

Due to the low cost of these devices and good coverage of GSM/GPRS, there is very little motivation for MTC device suppliers to use modules supporting the LTE radio interface.

This will cost operators not only in terms of maintaining multiple RATs (Radio Access Technology), but also prevent operators to reap the maximum benefit out of their spectrum (given the non-optimal spectrum efficiency of GSM/GPRS).

Therefore, it is necessary to find a solution to ensure that there is a clear business benefit to MTC device vendors and operators for migrating low-end MTC devices from GSM/GPRS to LTE networks.

Currently, LTE UEs should support all possible bandwidth, including 1.4, 3, 5, 10, 15, and 20 MHz. As analyzed and discussed in 3GPP R1-113440, the cost savings could potentially be achieved by cost reduction of a category 1 UE (as discussed in 3GPP TS 36.306 V10.3.0) supporting 20 MHz bandwidth to a UE operating in a 1.4 MHz bandwidth with data rate 100 Kbps. And the greatest cost saving is achieved by reducing bandwidth supported by UE. It is also mentioned in 3GPP R1-112912 that reduction in supported bandwidth is one of the key factors to reduce the complexity of LTE UE.

In the current 3GPP TS 36.331 V10.3.0 RRC protocol specification, cell re-selection information, including neighboring cell and frequency priority, is provided by the system information.

In general, SystemInformationBlockType4 is used to provide intra-frequency cell re-selection information. In 3GPP TS 36.331 V10.3.0, the SystemInformationBlockType4 information element is defined as follows:

```
SystemInformationBlock4 : :=      SEQUENCE {
    intraFreqNeighCellList        IntraFreqNeighCellList      OPTIONAL,   -- Need OR
    intraFreqBlackCellList        IntraFreqBlackCellList      OPTIONAL,   -- Need OR
    csg-PhysCellIdRange           PhysCellIdRange             OPTIONAL,   -- Cond CSG
    ...,
    lateNonCriticalExtension      OCTET STRING                OPTIONAL    -- Need OP
}
IntraFreqNeighCellList : :=       SEQUENCE (SIZE (1 . .maxCellIntra) ) OF IntraFreqNeighCellInfo
IntraFreqNeighCellInfo : :=       SEQUENCE {
    physCellId                        PhysCellId
    q-OffsetCell                      Q-OffsetRange,
    ...
}
IntraFreqBlackCellList : :=       SEQUENCE (SIZE (1 . .maxCellBlack)) OF PhysCellIdRange
```

In general, SystemInformationBlockType5 is used to provide inter-frequency cell re-selection information within E-UTRA (Evolved Universal Terrestrial Radio Access). In 3GPP TS 36.331 V10.3.0, the SystemInformationBlockType5 information element is defined as follows:

```
SystemInformationBlockType5 ::=   SEQUENCE {
    interFreqCarrierFreqList          InterFreqCarrierFreqList,
    ...,
    lateNonCriticalExtension          OCTET STRING                OPTIONAL   -- Need OP
}
InterFreqCarrierFreqList : :=     SEQUENCE (size (1 . .maxFreq) ) OF InterFreqCarrierFreqInfo
InterFreqCarrierFreqInfo : :=     SEQUENCE {
    dl-CarrierFreq                    ARFCN-ValueEUTRA,
    q-RxLevMin                        Q-RxLevMin,
    p-Max                             P-Max                       OPTIONAL,  -- Need OP
    t-ReselectionEUTRA                T-Reselection,
    t-ReselectionEUTRA-SF             SpeedStateScaleFactors      OPTIONAL,  -- Need OP
    threshX-High                      ReselectionThreshold,
    threshX-Low                       ReselectionThreshold,
    allowedMeasBandwidth              AllowedMeasBandwidth,
    presenceAntennaPort1              PresenceAntennaPort1,
    cellReselectionPriority           CellReselectionPriority     OPTIONAL,  -- Need OP
    neighCellConfig                   NeighCellConfig,
    q-OffsetFreq                      Q-OffsetRange               DEFAULT dB0,
    interFreqNeighCellList            InterFreqNeighCellList      OPTIONAL,  -- Need OR
    interFreqBlackCellList            InterFreqBlackCellList      OPTIONAL,  -- Need OR
    ...,
    [ [ q-QualMin-r9                  Q-QualMin-r9                OPTIONAL,  -- Need OP
        threshX-Q-r9                  SEQUENCE {
            threshX-HighQ-r9              ReselectionThresholdQ-r9,
            threshX-LowQ-r9               ReselectionThresholdQ-r9
        }                                                         OPTIONAL   -- Cond RSRQ
    ] ]
}
InterFreqNeighCellList : :=       SEQUENCE (SIZE (1 . .maxCellInter) ) OF InterFreqNeighCellInfo
InterFreqNeighCellInfo : :=       SEQUENCE {
    physCellId                        PhysCellId,
    q-OffsetCell                      Q-OffsetRange
}
InterFreqBlackCellList : :=       SEQUENCE (SIZE (1 . .maxCellBlack)) OF PhysCellIdRange
```

SystemInformationBlockType6, SystemInformationBlockType7, and SystemInformationBlockType8 include inter-RAT cell re-selection information for UTRA, GERAN, and CDMA2000.

On the other hand, when the UE is in the connected mode, it can be configured to perform some measurement (e.g., RRM measurement) by dedicate signaling (e.g., a RRCConnectionReconfiguration message). As specified in 3GPP TS 36.331 V10.3.0, the measurement configuration enables the UE to perform the measurement for neighbor cells or frequencies, and provide the measurement result to the eNB if configured.

In LTE system, PDCCH (Physical Downlink Control Channel) is generally used to indicate scheduling information to a UE, such as where to receive the corresponding PDSCH (Physical Downlink Shared Channel) for DL reception or PUSCH (Physical Uplink Shared Channel) for UL (uplink) transmission. PDCCH occupies several OFDM (Orthogonal Frequency-Division Multiplexing) symbols in the beginning of a subframe, such as a control region. The rest of the symbols, other than control region, could be used for PDSCH, whose corresponding scheduling information is carried by PDCCH in the same subframe, as discussed in 3GPP TS 36.213 V10.3.0. PDCCH is generally composed of several CCEs (Control Channel Element). Each CCE is composed of several REGs (Resource element Group), as discussed in 3GPP TS 36.211 V10.3.0. The scheduling unit of resource is PRB (Physical Resource Block).

As discussed in 3GPP R1-114329, E-PDCCH (Enhanced Physical Downlink Control Channel) will be introduced for scheduling control information in the data region (such as, a PDSCH region) so that it would be easier to achieve interference control.

It could be assumed that a low cost MTC does not support all possible (DL) bandwidth. For example, a low cost MTC may only support 1.4 MHz bandwidth. If no new mechanism (such as a special scheduling for a low cost MTC) is introduced to help the low cost MTC for connecting/camping on a cell with unsupported bandwidth, it would be difficult for the low cost MTC to camp on a (legacy) 20 MHz cell because the low cost MTC cannot successfully decode PDCCH of the cell (for example, SystemInformationBlockType1 could not be received successfully).

With current mechanisms specified in 3GPP TS 36.331 V10.3.0 and TS 36.304 V10.3.0, E-UTRA and/or inter-RAT frequencies provided to the UE (e.g., via system information) need to be continually measured to evaluate whether cell re-selection should be performed or not. It is also possible for a low cost MTC to perform cell re-selection (e.g., due to mobility). When a UE performs measurement for cell re-selection evaluation purpose, the UE would not need to receive a MIB (Master Information Block) which contains DL bandwidth information of a cell.

However, if no new mechanism for a low cost MTC is introduced, it would be unnecessary for a low cost MTC to perform cell re-selection evaluation for a cell with unsupported (DL) bandwidth or a frequency without having a cell with supported (DL) bandwidth. Power consumption would increase due to unnecessary measurement for cell re-selection evaluation. In addition, there would be delays from completing cell re-selection when required because measuring cells with unsupported bandwidth also takes time.

On the other hand, the RRM (Radio Resource Management) measurement could provide neighboring cell measurement information to the serving eNB from the UE. The measurement information (e.g., the measurement report) could facilitate the handover decision of the eNB. Similar to the cell re-selection evaluation, if no new mechanism for a low cost MTC is introduced, the low cost MTC UE would not be needed to provide the measurement information for a neighboring cell with unsupported (DL) bandwidth or for a frequency without having a cell with supported (DL) bandwidth since the low cost MTC UE is unable to perform a handover to this kind of cell or frequency. Although the RRM measurement configuration is configured by dedicated signaling, the legacy eNB may not know the exact capability of the low cost MTC UE. Therefore, the UE configuration may not take the low cost MTC capability into account.

In one embodiment, in addition to the current cell re-selection information (as discussed in 3GPP TS 36.331 V10.3.0), some additional information could be provided or preconfigured to help a low cost MTC to decide whether a cell (or a frequency) should be considered in cell re-selection evaluation or whether the low cost MTC is able to camp on a cell (or a frequency). In this embodiment, the low cost MTC could be a UE that supports a largest bandwidth that is less than 20 MHz. Furthermore, the additional information could be (1) the bandwidth of a neighboring cell or a frequency, or (2) an indication for low cost MTC support of a neighboring cell or a frequency. The low cost MTC could use the additional information (provided by the system information or other method) to decide whether to perform cell re-selection evaluation for a cell or a frequency. Alternatively, after receiving cell re-selection information including neighboring cell information, a low cost MTC should acquire MIB of the neighboring cell to decide whether to consider the neighboring cell in cell re-selection evaluation (for example, whether to measure the neighboring cell).

Figure 5:
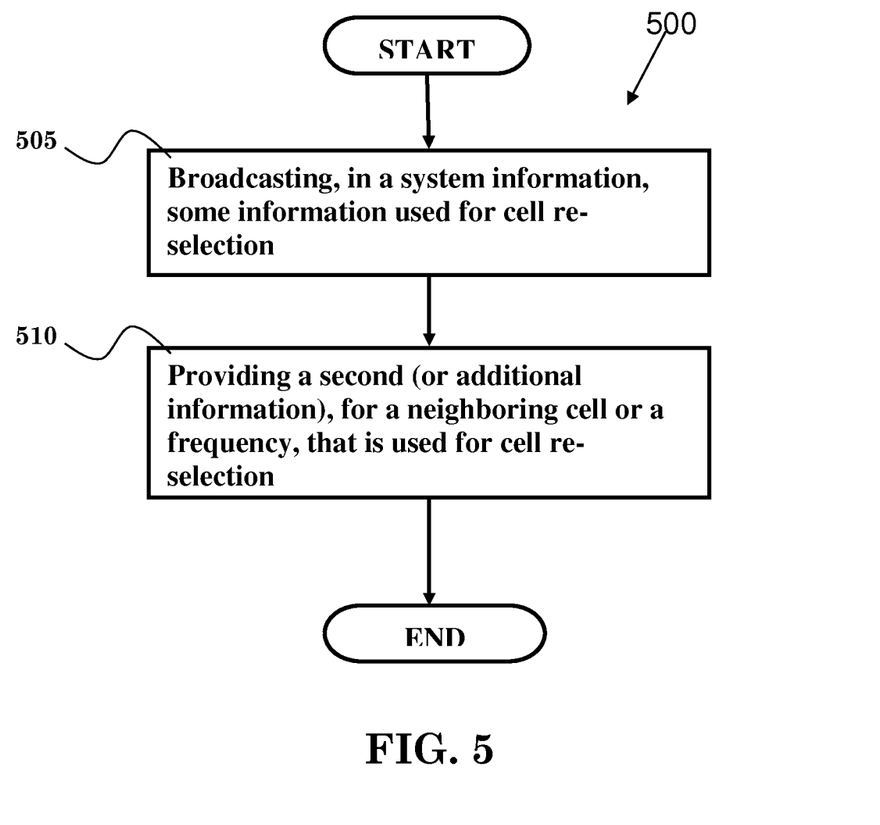
FIG. 5 is a flow chart according to one exemplary embodiment.

FIG. 5 illustrates an exemplary flowchart 500 in accordance with one embodiment. In step 505, some information that is used for cell re-selection is broadcasted in a system information. In step 510, a second (or additional) information, for a neighboring cell or a frequency, that is used for cell re-selection is provided.

Referring back to FIGS. 3 and 4, the UE 300 includes a program code 312 stored in memory 310. In one embodiment, the CPU 308 could execute the program code 312 (i) to broadcast, in a system information, a first information used for cell re-selection, and (ii) to providing a second information, for a neighboring cell or a frequency, that is used for cell re-selection. In addition, the CPU 308 can execute the program code 312 to perform all of the above-described actions and steps or others described herein.

In another embodiment, in addition to the current measurement configuration (as discussed in 3GPP TS 36.331 V10.3.0), additional information (e.g., a cell list or a frequency list) could be provided to help a low cost MTC to decide whether a cell or a frequency should be considered in the RRM measurement and/or measurement reporting. For example, if the additional information is a white list, the UE would consider the cells or frequencies in the list for measurement and/or measurement reporting. Furthermore, the UE would not consider the cells or frequencies not in the white list for measurement and/or measurement reporting. The additional information could also be a black list. Alternatively, after receiving the measurement configuration, a low cost MTC could acquire MIB of the neighboring cell to decide whether to consider the neighboring cell in the RRM measurement and/or the measurement reporting (such as, whether to measure the neighboring cell).

Similar concepts described herein could also be applied to cell selection (e.g., for turning on the UE, RRC connection re-establishment, or entering RRC_IDLE). More specifically, additional information (e.g., a cell list or a frequency list) could be provided or preconfigured to help a low cost MTC to decide whether a cell or a frequency should be considered in cell selection evaluation.

Figure 6:
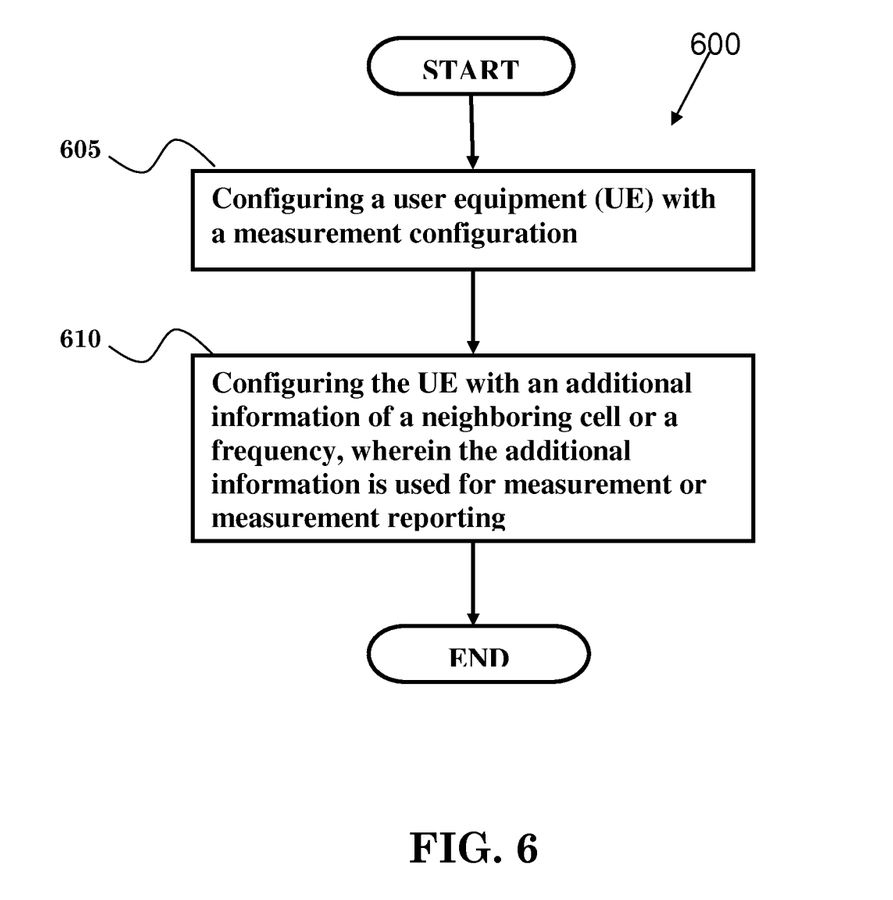
FIG. 6 is a flow chart according to one exemplary embodiment.

FIG. 6 illustrates an exemplary flowchart 600 in accordance with one embodiment. In step 605, a user equipment (UE) is configured with measurement configuration. In step 610, the UE is configured with additional information of a neighboring cell or a frequency. The additional information is used for measurement and/or measurement reporting.

Referring back to FIGS. 3 and 4, the UE 300 includes a program code 312 stored in memory 310. In one embodiment, the CPU 308 could execute the program code 312 (i) to configure a user equipment (UE) with a measurement configuration, and (ii) to configure the UE with additional information of a neighboring cell or a frequency, the additional information is used for measurement or measurement reporting. In addition, the CPU 308 can execute the program code 312 to perform all of the above-described actions and steps or others described herein.

In one embodiment, the second information (or the additional information) could be one or a combination of the following items:
the downlink (DL) bandwidth of a neighboring cell;
an indication whether a cell or a neighboring cell uses a specific bandwidth or DL bandwidth;
an indication whether a cell or a neighboring cell supports a low cost MTC;
a list of cells or neighboring cells supporting a low cost MTC;
a list of cells or neighboring cells using a specific bandwidth or DL bandwidth;
a list of frequencies having a cell supporting a low cost MTC;
a list of frequencies with a cell using a specific bandwidth or DL bandwidth;
an indication whether there is a cell on a frequency using a specific bandwidth or DL bandwidth;
an indication whether there is a cell on a frequency supporting a low cost MTC;
the smallest bandwidth or DL bandwidth used by cell(s) on a frequency; and/or
a frequency priority used by a low cost MTC.

In addition, in one embodiment, the second information (or the additional information) could be (i) provided in the system information or in a dedicated signaling (such as by RRC or NAS—"Non Access Stratum"), or (ii) pre-configured (such as hard-coded in an USIM—"Universal Subscriber Identity Module"). The system information could be SystemInformationBlockType4, SystemInformationBlockType5, SystemInformationBlockType6, SystemInformationBlockType7, SystemInformationBlockType8, or a new system information block type.

Furthermore, in one embodiment, the neighboring cell could be an intra-frequency cell or an inter-frequency cell that uses E-UTRA, UTRA, GERAN (GSM/EDGE Radio Access Network), or CDMA2000 frequency. The cell reselection could be intra-frequency, inter-frequency (within E-UTRA), or inter-RAT cell re-selection. The measurement could be intra-frequency, inter-frequency, or inter-RAT measurement. In addition, the low cost MTC could be a UE that only supports 1.4 MHz bandwidth or that does not support 20 MHz bandwidth or that does not support any bandwidth larger than 5 MHz.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for improving cell re-selection in a wireless communication system, comprising:
   broadcasting, by an Evolved Universal Terrestrial Radio Access Network (E-UTRAN), a first information and a second information in a system information, wherein the first information is used for cell re-selection performed by a first User Equipment (UE) supporting 20 MHz bandwidth, the second information is used for cell re-selection performed by a second UE supporting a largest bandwidth less than 20 MHz, and the second information includes a list of neighboring cells supporting a second UE.

2. The method of claim 1, wherein the second information includes a list of frequencies that have a cell supporting the second UE.

3. The method of claim 1, wherein the first information and the second information are in different system information block types of the system information.

4. The method of claim 1, wherein the neighboring cells are intra-frequency neighboring cells.

5. The method of claim 1, wherein the neighboring cells are inter-frequency neighboring cells.

6. The method of claim 1, wherein the cell re-selection is performed when the first UE or the second UE is in idle mode.

7. The method of claim 1, wherein cell re-selection evaluation is not based on Master Information Block (MIB) of the neighboring cell.

8. The method of claim 1, wherein cell re-selection evaluation is not performed by the second UE for a cell not supporting the second UE.

9. The method of claim 1, wherein cell re-selection evaluation is performed by the second UE for a cell supporting the second UE.

10. The method of claim 1, wherein the first information includes a list of neighboring cells supporting the first UE.

11. The method of claim 1, wherein the first information includes a list of frequencies that have a cell supporting the first UE.

12. A communication device for improving cell re-selection in a wireless communication system, the communication device comprising:
    a control circuit;
    a processor installed in the control circuit;
    a memory installed in the control circuit and operatively coupled to the processor;
    wherein the processor is configured to execute a program code stored in memory to improve the MTC device by:
       broadcasting a first information and a second information in a system information, wherein the first information is used for cell re-selection performed by a first User Equipment (UE) supporting 20 MHz bandwidth, the second information is used for cell re-selection performed by a second UE supporting a largest bandwidth less than 20 MHz, and the second information includes a list of neighboring cells supporting the second UE.

13. The communication device of claim 12, wherein the second information includes a list of frequencies that have a cell supporting the second UE.

14. The communication device of claim 12, wherein the first information and the second information are in different system information block types of the system information.

15. The communication device of claim 12, wherein the neighboring cells are intra-frequency neighboring cells.

16. The communication device of claim 12, wherein the neighboring cells are inter-frequency neighboring cells.

17. The communication device of claim 12, wherein the cell re-selection is performed when the first UE or the second UE is in idle mode.

18. The communication device of claim 12, wherein cell re-selection evaluation is not based on Master Information Block (MIB) of the neighboring cell.

19. The communication device of claim 12, wherein cell re-selection evaluation is not performed by the second UE for a cell not supporting the second UE.

20. The communication device of claim 12, wherein cell re-selection evaluation is performed by the second UE for a cell supporting the second UE.

21. The communication device of claim 12, wherein the first information includes a list of neighboring cells supporting the first UE.

22. The communication device of claim 12, wherein the first information includes a list of frequencies that have a cell supporting the first UE.

* * * * *